United States Patent
Thomas

(10) Patent No.: US 7,216,941 B2
(45) Date of Patent: May 15, 2007

(54) PARKING BRAKE LOCK-IN KEY SWITCH SYSTEM WITH AUTOMATIC APPLICATION FOR A VEHICLE WITH AN AIR BRAKE SYSTEM

(75) Inventor: James A. Thomas, Spencerville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 192 days.

(21) Appl. No.: 11/109,116

(22) Filed: Apr. 18, 2005

(65) Prior Publication Data

US 2006/0232125 A1    Oct. 19, 2006

(51) Int. Cl.
*B60R 25/08* (2006.01)
*B60T 13/00* (2006.01)

(52) U.S. Cl. ............................... 303/89; 303/7
(58) Field of Classification Search ............... 303/89, 303/7
See application file for complete search history.

(56) References Cited

U.S. PATENT DOCUMENTS

| | | | | |
|---|---|---|---|---|
| 3,487,451 A | * | 12/1969 | Fontaine | 303/19 |
| 3,790,223 A | * | 2/1974 | Fontaine | 303/19 |
| 3,830,330 A | * | 8/1974 | Fontaine | 180/273 |
| 5,036,961 A | * | 8/1991 | Eberling et al. | 477/186 |
| 5,335,978 A | * | 8/1994 | laBastide, Jr. | 303/13 |
| 5,458,402 A | * | 10/1995 | Jeffery | 303/13 |
| 5,572,187 A | * | 11/1996 | Williford | 340/454 |
| 5,630,489 A | * | 5/1997 | Bebernes | 192/219.4 |
| 6,007,159 A | * | 12/1999 | Davis et al. | 303/89 |
| 6,135,230 A | * | 10/2000 | Schenck et al. | 180/273 |
| 6,234,586 B1 | * | 5/2001 | Davis et al. | 303/89 |
| 6,322,159 B1 | * | 11/2001 | Eberling | 303/7 |
| 6,655,750 B2 | * | 12/2003 | Soupal | 303/9 |
| 6,743,277 B2 | * | 6/2004 | Goodell et al. | 95/19 |
| 6,758,298 B2 | * | 7/2004 | Eberling et al. | 180/272 |

* cited by examiner

*Primary Examiner*—Robert A. Siconolfi
(74) *Attorney, Agent, or Firm*—Jeffrey P. Calfa; Gerald W. Askew; Susan L. Lukasik

(57) ABSTRACT

A parking brake system for motor vehicle air brakes provides automatic engagement of the parking brakes when a gearshift lever is moved to park, but requires manual disengagement of the parking brakes. The effect is achieved in part by controlling the discharge conditions of two piloted latch valves connected to feed air to a cab mounted push pull double check valve.

9 Claims, 2 Drawing Sheets

PARKING BRAKE LOCK-IN KEY SWITCH SYSTEM WITH AUTOMATIC APPLICATION FOR A VEHICLE WITH AN AIR BRAKE SYSTEM

BACKGROUND OF THE INVENTION

1. Technical Field

The present invention relates to a parking brake lock-in key switch system for a truck or bus air brake system.

2. Description of the Problem

In prior art air brake systems used on truck and bus chassis manufactured by International Truck and Engine Corp., separate air lines run from the primary air tank and the secondary air tank to a parking brake actuator. The parking brake actuator is a push pull double check (PPDC) valve, which aligns the tank with the higher pressure to supply air to the brake chambers for individual wheel parking brakes. When pulled out to an 'Engaged' position, the push pull portion of the actuator closes off the air supply passageway from the air tanks and vents a single downstream air line. The single downstream air line from the PPDC valve runs from the valve through an inversion (relay) valve and a quick release valve to spring brake chambers which act in a parking brake mode. The spring or park brake chambers are part of the individual brake assemblies for each wheel subject to park braking. Typically, the vehicle's rear wheels have the brake assemblies which act as parking brakes in addition to having a service brake function. The springs in the spring brake chambers act to lock the individual wheels when there is no air applied to counter the spring force. Operation of the push pull knob of the parking brake actuator with its resulting venting of the down stream air piping to the brake chambers allows the spring brakes to lock the individual wheels associated with the park braking. In normal operation the spring brake chambers lock the individual wheels only so long as the parking brake actuator is in the 'Engaged' or pulled out position.

Vehicles with hydraulically operated service brakes have had air assisted drive line parking brakes in the prior art. While the hydraulic service brakes act directly on the wheels of the vehicle, the drive line parking brakes act to lock the drive line prop shaft of the vehicle. An air brake cylinder is engaged to the drum in the driveline which locks the shaft. The air brake cylinder allows the shaft to rotate when air is supplied to the cylinder. The air is provided from a single air reservoir through a parking spring brake control through a one-way check valve to the air brake cylinder. When the driver operates the parking spring brake control to the engaged position, the air supply to the cylinder is stopped and the downstream piping is vented. Upon the venting of the piping between the spring brake central and the air brake cylinder, the air brake cylinder will cause the drum brake to lock the driveline prop shaft. Similar to the above described air brake system, the drum brake will only continue to lock the prop shaft so long as the parking spring brake control is in the 'Engaged' position.

Automatic parking brake systems exist in the prior art which automatically vent downstream air lines supplying brake chambers or cylinders associated with park braking upon the operator turning the ignition key to an 'off' position. Automatic engagement of the parking brakes follows. A problem with such systems is that a driver or passenger may inadvertently engage the parking brakes while the vehicle is operating at highway speeds by bumping the ignition key to a non-operating or 'off' position. Involuntary braking could result. In addition, bus engines are not typically shut off at bus stops, with the result that the system does not operate when needed.

U.S. Pat. No. 6,234,586 describes vehicles such as school buses equipped with air brake systems and having a driver operated parking brake actuator. Following manual engagement of the parking brake actuator, the parking brake lock-in key switch system will lock the parking brake in the engaged position upon the driver turning the ignition key to the 'off' position. This effectively disables the parking brake actuator thereby preventing inadvertent release of the parking brake. This system does not allow inadvertent initiation of the parking brake should the ignition key be moved to the 'off' position while the vehicle is in motion. The driver must first consciously operate the parking brake actuator for the parking brake lock-in key switch system. In some vehicles with automatic transmissions an automatic apply-automatic release parking brake system operates in parallel with the parking brake lock-in key switch system. The automatic apply-automatic release parking brake system has a valve that acts to operate and engage the parking brake when the automatic transmission is placed in the _Park_ position. The valve of the automatic apply-automatic release parking brake system in these systems deactivates and releases the parking brake when the transmission shifter is moved out of the _Park_ position and the engine of the vehicle is running. With automatic application of the parking brakes when the vehicle transmission is placed in park, but a requirement for service brake application, key on and deliberate brake release prior to release of the parking brakes, there is little chance of a bus passenger releasing the brake, even if the driver is not in his seat.

Air brake vehicles are available with a key and service brake interlock function which requires a driver to turn the ignition key to the ON position and to apply the service brake prior to releasing the park brake. It is desirable to provide a system which automatically applies the park brakes when the vehicle automatic transmission is shifted into the Park position. It is also desirable that the driver would then have to reapply the service brake prior to disengaging the parking brakes.

SUMMARY OF THE INVENTION

The invention provides for these and other purposes and is robust, easily installable and maintained. In as the preferred embodiment is intended as an add on or optional feature usable with standard air brake systems, all additional components are adapted to fit into the cab or cowl area to ease installation as an accessory.

The invention provides a parking brake system for an air brake system which automatically applies the parking brakes upon an operator moving an automatic transmission shift lever to park and which requires the driver to reapply the service brake prior to disengaging the parking brakes. The parking brake system of the present invention has primary and secondary sources of compressed air, primary circuit and secondary circuit lock in valves, a push pull double check valve connected to the primary and secondary sources of compressed air with the primary and secondary circuit lock in valves located between the primary and secondary sources and the inputs to the push pull double check valve. The primary and secondary circuit lock in valves are pilot valves. Exhaust of the primary and secondary circuit lock in valves is controlled using exhaust control valves. An air signal source responsive to the position of an ignition switch provides a pilot signal for the actuation of the primary and secondary lock in valves. An air signal line extends from the push pull double check valve. Transmission status and the pressure in the air line connecting the push pull double check valve to the spring chambers of the parking brakes effect control of the parking brakes.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
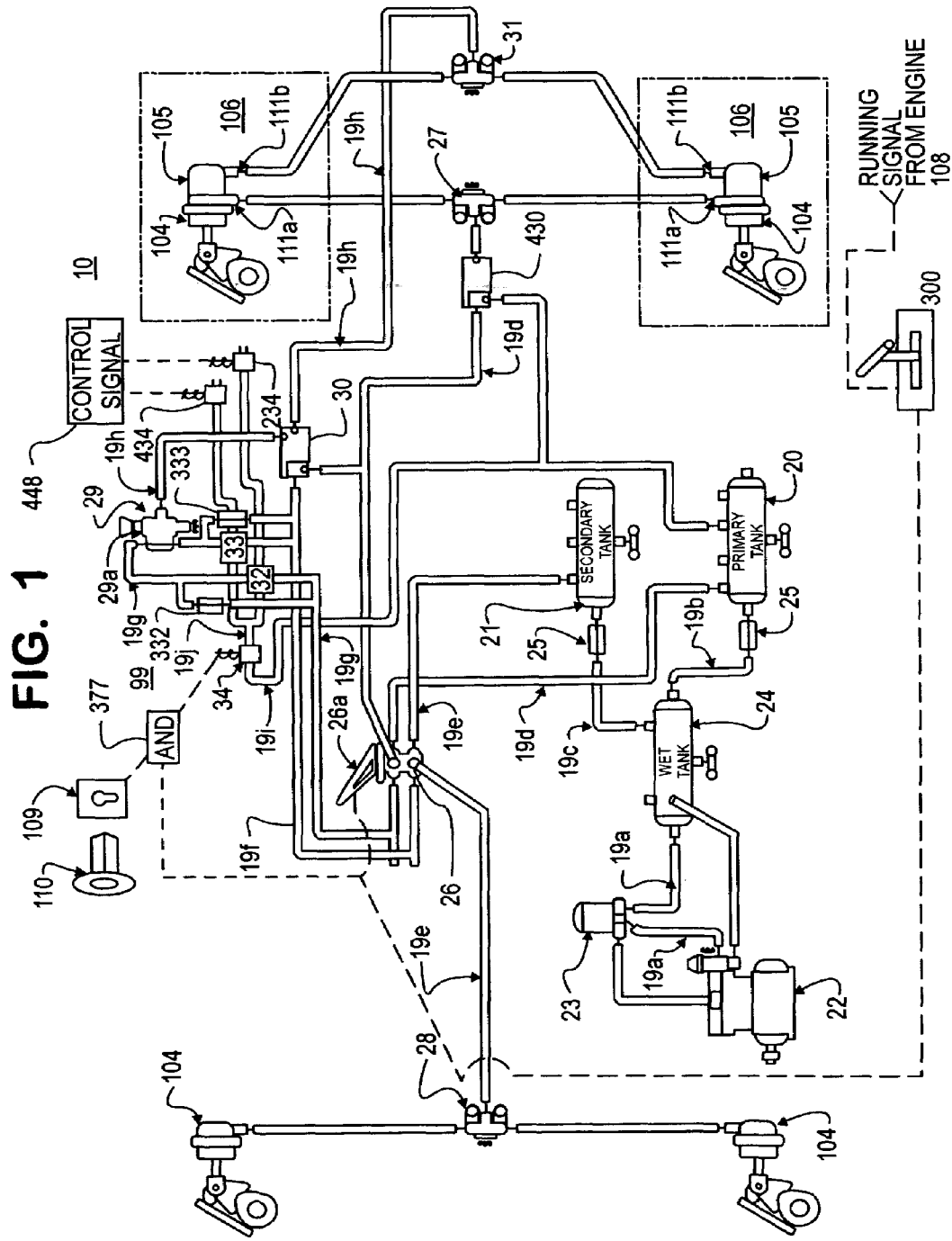
FIG. 1 is a schematic illustration of an air brake system built pursuant to the teaching of the present invention.

Referring now to the drawings and in particular to FIG. 1, an air brake system 10 for a vehicle such as a school bus is illustrated. Air brake system 10 is illustrated as configured for a vehicle having two front wheels and two rear wheels (not shown). Associated with the front wheels and the rear wheels are individual wheel mounted service brakes 104. The rear wheel brake assemblies 106 include a park or spring brake chamber 105 in addition to the service brake 104. Thus the rear brake assemblies 106 provide both service braking and park braking. The dual function of the rear brake assemblies 106 is accomplished by having two separate air ports 111a and 111b on the service brake chambers 104 and the spring brake chambers 105, respectively. The service braking air port 111a allows air to be directed to the service brake chamber 104 to move brake pads (not shown) to stop the rear wheels. The park braking port 111b allows air to be directed to the spring brake chambers 105 to act counter internal springs which normally urge application of the brake pads. When the parking brake is disengaged, compressed air holds the park brakes off and free movement of the rear wheels is allowed.

The automatic parking brake system of the invention operates in cooperation with the vehicle ignition system. An ignition 109 for starting a vehicle engine is provided having four states, off, accessory, run and start. A driver of the vehicle inserts a key 110 into the ignition 109 and turns the key to the start position to start the engine. After the engine starts and the driver releases the key, the key returns to a run position which allows the engine to continue operating. The driver will turn the key 110 to an 'off' position to stop the engine after parking the vehicle. The ignition 109 also has an 'accessory' position to allow operation of vehicle utility equipment 119 such as a radio.

Components in the air brake system 10 are supplied with compressed air via air lines 19a–j. An air compressor 22 supplies air via air lines 19a to, and though, an air dryer 23 to a wet tank 24. The wet tank 24 acts as a supply reservoir for both the primary air tank 20 and the secondary air tank 21, which in turn directly supply the service and parking brake systems. Air lines 19b and 19c, respectively, deliver air from the wet tank 24 to the primary tank 20 and the secondary tank 21. Check valves 25 are incorporated into air lines 19b and 19c allowing air to flow out from the wet tank 24 but not back into the wet tank.

Primary air tank 20 and a secondary air tank 21 are the direct sources of supply of pressurized air for a redundant air brake system 10. In a bus or truck where most of the weight can be over the rear wheels, the primary air tank 20 supplies air for service braking for the rear wheels. The secondary air tank 21 supplies air for service braking for the front wheels. Since independent sources of air are used for the service brakes for the rear and front wheels the service brake system is considered to be redundant. Air is routed from primary air tank 20 via air line 19d through a foot actuated double valve 26 upon depression of foot pedal 26a. For a brake system predating anti-lock braking systems (ABS), such as illustrated, air is then routed to a rear wheel service brake quick release valve (QRV) 27. On ABS equipped vehicles QRVs are used only for rear parking brake functions. ABS modulators perform the QRV functions. A relay valve 430 uses air from the food pedal 26 as a pneumatic signal for applying air to QRV 27 directly from primary tank 20. Air from secondary air tank 21 is coupled to the service brake chambers 104 for the front wheels for service braking via air line 19e through the double valve 26 upon depression of foot pedal 26a. Again a front wheel service brake QRV 28 is illustrated, although in vehicles equipped with ABS, no QRV is present and the functionality of the QRV is carried out by an ABS modulator. The operation of the quick release valves, or ABS modulators, is conventional and well known in the art.

The park brakes are held in a disengaged state by the application of compressed air to park braking ports 111b. The park brake function occurs when air is vented from park braking port 111b of the spring or park brake chamber 105 through QRV 31. Air is coupled from the primary air tank 20 and the secondary air tank 21 to the spring brake chambers 105 for holding the springs open and controlling the engagement of park braking. Air lines 19f, 19g and 19h are directly involved in the routing of air to and from the ports 111b.

The parking brake system makes use of the redundant compressed air sources to avoid unintended engagement of the parking brake system should one compressed air source fail. Air lines 19f and 19g supply air from the primary and secondary tanks 20, 21 through the double valve 26 to a push pull double check (PPDC) valve 29. The air enters the double valve 26 into tees, past the double check valves and into the IN ports of the pilot valves 32, 33. When the pilot valves 32, 33 open air is supplied to the primary and secondary inputs of the PPDC 29. From the pilot valves 32, 33 the air is introduced to the push pull double check valve 29 from which a single air line 19h emerges. Air line 19h extends from PPDC valve 29 to an inversion valve 30. Air is applied through to parking brake QRV 31 from inversion valve 30 in response to pneumatic input signals on air lines 19f and 19h.

Application of the park brakes occurs automatically or manually, as described below. Automatic engagement can be initiated when the appropriate combination of signals appear for actuating control valve 34, which in turn applies air actuation signals to the pilot valves 32, 33 which in turn supply air to the inputs of the PPDC 29. When solenoid control valve 34 and pilot valves 32, 33 close, the air signals to the PPDC 29 cannot escape so long as exhaust control valves 234 and 434 remain closed. The PPDC 29 air supply is in effect latched and the parking brakes prevented from actuating. With pilot valves 32, 33 normally closed due to lack of brake application and thus lack of an interlock signals, the exhaust control valves 234, 434 control automatic actuation of the parking brakes. Latched pressure in the PPDC valve 29 lines escapes with opening of exhaust control valves 234, 434.

To manually engage the parking brake the driver of a vehicle 101 moves a parking brake actuator or knob 29*a* to an engaged or pulled out position which operates the push pull double check valve 29. Push pull double check valve 29 operates to shut off the air supply from air lines 19*f* and 19*g* from the primary air tank 20 and the secondary air tank 21 and to vent air line 19*h* to the external atmosphere. Lack of pressure in air line 19*h* allows QRV 31 to vent air from ports 111*b* to the atmosphere. The springs in the spring brake chambers 105 then act to Lock the two rear wheels. If the parking brake actuator or knob 29*a* is moved out of the engaged position (i.e. pushed in), air will be supplied through the push pull double check valve 29 to the spring brake chambers 105 through air line 1 9*h* to release the rear wheels. The control signal for solenoid valve 34 comes from transmission shifter 300, which can be set to implement an interlock limiting operation of the parking brake to when the transmission is in park. Operation of PPDC valve 29 is readily automated using a transmission state signal.

The air brake system 10 of the present invention includes a park brake lock-in based on key switch position. Lock-in is, in essence, the latching of the state of certain air pressure signals. A primary parking brake lock-in or pilot valve 32 and a secondary parking brake lock-in or pilot valve 33 provide air signal state latching. The primary parking brake pilot valve 32 is located in air line 19*g* (downstream from air line 19*d*) between the primary air tank 20 and the push pull double check valve 29. Closure of the primary parking brake pilot valve 32 will stop air from flowing from the primary air tank 20 to the push pull double check valve 29. The secondary parking brake pilot valve 33 is located in air line 19*f* between the secondary air tank 21 (via air line 19*e*) and the push pull double check valve 29. Closure of the secondary parking brake lock-in/pilot valve 33 will stop air from flowing from the secondary air tank 21 to the push pull double check valve 29. Closure of both the primary parking brake lock-in valve 32 and the secondary parking brake lock-in valve 33 stops air flow through push-pull double check valve 29 to the parking brake port 111*b* of the spring brake chambers 105. The primary parking brake pilot valve 32 and a secondary parking brake pilot valve 33 are of a design such that downstream air line piping to the spring brake chambers 105 through the push pull double check valve 29 is not vented when the parking brake pilot valves 32 and 33 are closed, absent loss of pressure in the primary and secondary air tanks 20, 21. Air trapped in air lines 19*h* and 19*g*, by the parking brake pilot valves 32 and 33 maintains a counter force against the springs of the spring brake chambers 105 to hold the parking brakes off.

The parking brakes should engage in case of total pressure failure in the air brake system. Accordingly, a failsafe venting system for air lines 19*f* and 19*g* is provided. Check valves 332, 333 couple the sections of air lines 19*f*, 19*g* downstream the parking brake pilot valves 32 and 33, but upstream from PPDC valve 29, back to air lines 19*f* and 19*g*, respectively, but upstream from the parking brake pilot valves. Loss of air pressure anywhere in air lines 19*e* and 19*d* results in sections of air lines 19*f* 19*g* subject to latching being vented through the check valves 332, 333. This results in PPDC 29 operating normally, exhausting air from air line 19*h* and thereby applying the parking brakes.

The parking brake system and ignition key switch work in cooperation with one another. Turning key 110 in the ignition switch 109 to the "off" position operates to close parking brake pilot valves 32 and 33 via solenoid control valve 34. The mechanism linking ignition switch 109 position with pilot valve 32, 33 operation is indirect. An intermediate solenoid pilot valve 34 controls valving of compressed air from primary tank 20 along an air line 19*j* to the control ports of parking brake pilot valves 32, 33. In other words, pilot valves 32, 33 are actuated by an air signal controlled by solenoid valve 34, the state of which depends on the position of the ignition switch 109. Solenoid valve 34 thus enables an interlock based on ignition switch 109 position.

Solenoid valve 34 is supplied with air from primary tank 20 by air line 19*i*. When solenoid 34 delivers air to the pilot ports of the pilot valves 32, 33, the pilot valves open and allow air to reach PPDC valve 29 through airlines 19*f*, 19*g*. This in turn allows the parking brake to be held in a released state as already described. When solenoid valve 34 returns to its normal state, air exhausts from the pilot valve 32, 33 control lines (including the branched portions of air line 19*j*) through the exhaust port for the solenoid pilot valve 34. Solenoid exhaust control valves 234, 434 on the exhaust ports from pilot valves 32, 33, respectively, and prevent air from escaping from the PPDC valve 29 however, thus latching the PPDC valve 29 open under certain circumstances. The source 448 of control signals for solenoid exhaust control valves 234, 434 is described below.

The presently disclosed system readily accommodates various interlocks. As illustrated, the ignition switch 109 position signal reaches solenoid valve 34 through an AND gate 377. AND gate 377 represents a variety of possible logic arrangements which may be implemented in hardware or through software control arrangements to define with particularity the conditions under the parking brake system operates. Interlock signals limiting operation of the park brake system may readily be based upon the state of not just the ignition switch 109, but also the position of the transmission gear selector 300, an engine running status signal 108, or the position of the brake pedal 26*a*.

Ignition switch 109 position is one interlock always used. So long as the parking brake actuator 29*a* is not engaged, moving the key 110 to the 'off' position will not result in release of air from air lines 19*h*, *f* and *g* since the operation of moving the key closes solenoid controlled valve 34. The rear wheels of the vehicle thus remain free to rotate. Any danger from accidental movement of the key 110 or intermittent faults in the ignition circuit are reduced.

The interaction of the ignition switch interlock and the pilot valves 32, 33 is now described. If the driver moves the parking brake actuator 29*a* to a parking brake engaged or pulled out position, the PPDC valve 29 closes off air to air line 19*h* and vents air line 19*h* as already described. Subsequent turning of the key 110 to an 'off' position closes solenoid controlled valve 34, closing the parking brake piloted valves 32, 33 which locks the park brake status by preventing new air to flow from the primary air tank 20 or secondary air tank 21 to the PPDC valve 29. If the parking brake actuator 29*a* is subsequently moved to its disengaged position (i.e. pushed in), the remaining air trapped in air line 19*h* between the primary parking brake lock-in valve 32 and the secondary parking brake lock-in valve 33 on the one hand and the relay valve 301 would be the small volume was trapped in air lines 19*g* and 19*f* between the parking brake lock-in valves 32 and 33 and the push pull double check valve 29. This small volume of air would be insufficient even to counter to internal springs (not shown) in the push pull double check valve 29 to open the push pull double check valve, much less hold the parking brakes off. In this manner, the turning of the key 110 of the ignition 109 to the 'off' position effectively disables the parking brake actuator 29a and maintains the rear wheels in a locked condition.

The state of solenoid exhaust control valves 234 and 434 is controlled by the air pressure level in air line 19h and the transmission gear selector 300. Operation of this aspect of the invention is best understood by reference to FIG. 2. With pilot valves 32, 33 closed (due to lack of the appropriate interlock signal) and solenoid exhaust valves 234, 434 opened, any trapped air pressure in 19f and 19g will exhaust back through pilot valves 32, 33 to the atmosphere, resulting in the parking brakes coming on. This occurs in response to moving the transmission gear selector 300 to park. In addition, a NO pressure switch 250 operates to trip relay 260. This signal is passed to the transmission gear selector 300, the signal from which is passed by transmission gear position switch 300, when in the Park position, to exhaust control solenoid valves 234, 434.

The automatic transmission is shifted using a shifter 300. The shifter 300 at a minimum has _Park_, _Neutral_, _Reverse_, and _Drive_ positions. When a driver depresses foot pedal 26a and moves transmission shifter 300 to the park position, an automatic parking brake application signal is generated. With an brake foot pedal 26a depressed and ignition 109 in the "run" state, the interlock requirements required for opening supply valve 34 are present. This opens pilot valves 32, 33 which keeps the parking brakes disengaged, even though transmission shifter 300 may be supplying an automatic parking brake application signal to exhaust solenoid valves 234, 434 opening the valves. However, as soon as service braking is discontinued, and the interlock signal to supply valve 34 interrupted, air escapes from the exhaust ports for pilot valves 32, 33, and the parking brakes are applied as already described. Dual exhaust control valves 234, 434 provide against single valve failure. That is, if one of the pilot valves 33, 32 failed, the PPDC valve 29 would still have air supply charge from the other pilot valve and the park brakes would remain disengaged.

Referring again to FIG. 2, the configuration of the electrical signal source for exhaust valves 234, 434 is illustrated and the layout of components relative to the cab firewall 500 is shown. Double valve 26, exhaust control valves 434, 234, push pull double check valve 29 and pilot valves 32, 33 are all located inside of the cab.

Figure 2:
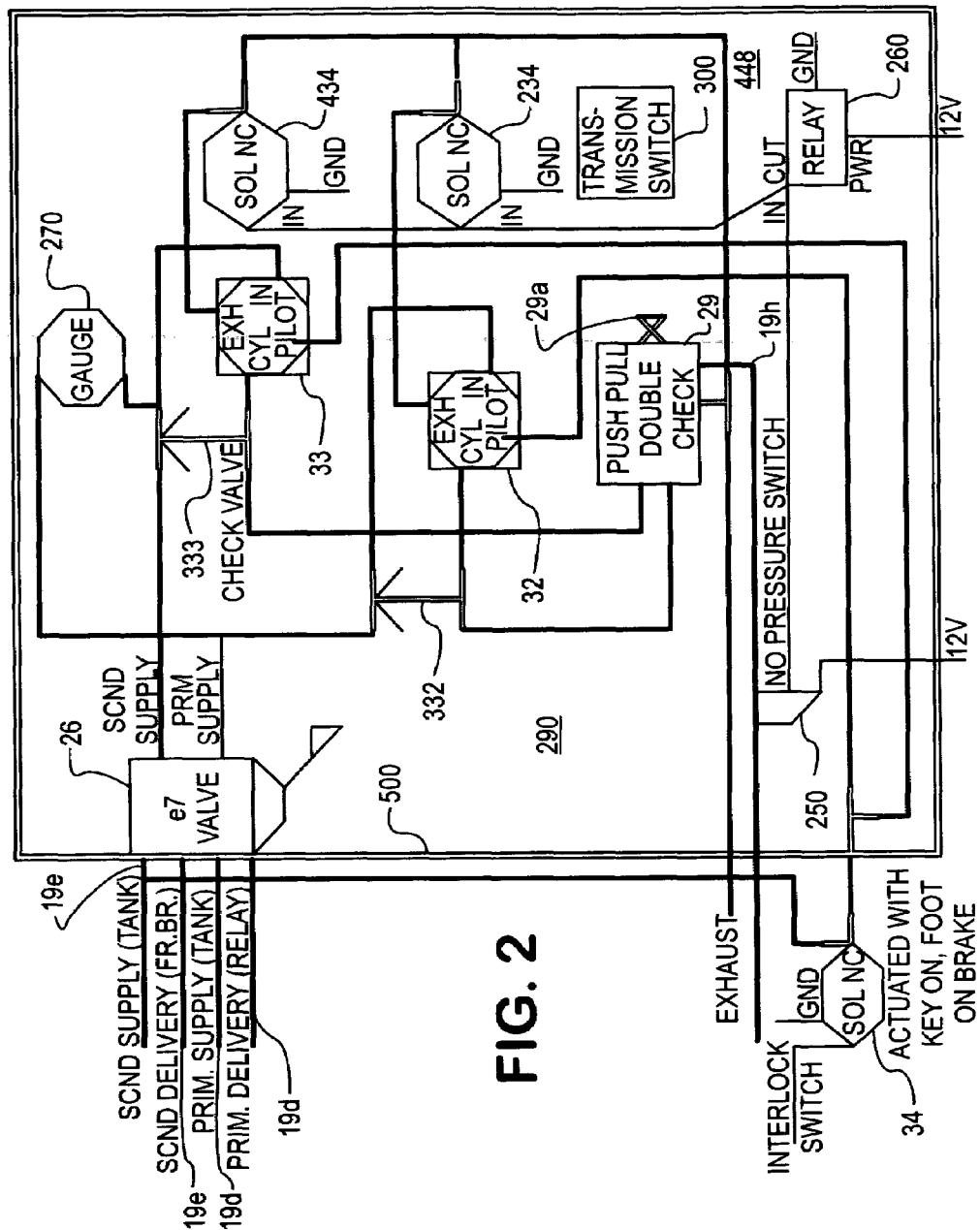
FIG. 2 is a detailed schematic illustration of particular control arrangements for the system of FIG. 1.

Disengagement of the parking brakes is required to be manually executed. A source 448 of a control signal for the operation of exhaust valves 234, 434 is illustrated in FIG. 1. In FIG. 2 this source 448 is developed as including a no pressure switch 250, a relay 260 and transmission switch 300. No pressure switch 250 exposed to spring brake signal air line 19h and is normally open. A relay 260 is controlled by switch 250 and provides for passing the signal to the transmission selector 300. Thus, if ignition switch 109 is moved to the off position before the transmission selector 300 is moved to the Park position, and before the driver manually engages the parking brakes, the NO air pressure switch 250 would result in relay 260 supplying power for the circuit, and the exhaust valves 234, 434 would be held open in order to vent air trapped by the closed pilot valves 32, 33. The NO pressure switch 250 is located on the delivery side of PPDC valve 29. A trigger level for NO air pressure switch, that is the pressure level at which power is made available to the circuit, is low enough to assure that the spring brakes release before the switch 250 opens and continuity is broken.

Many of the major elements of the system are installed inside the cab environment 290, which means they can be installed off the main assembly line for a vehicle. The use of electrical signals and logic make the system for flexible in terms of selecting interlocks. Automatic application is retained, but deliberate disengagement of the parking brakes makes the system less vulnerable to human error. This is particularly important in school bus applications, where passengers may manipulate the controls without an appreciation for the consequences of their actions or the ability to respond to those consequences.

While the invention is shown in only one of its forms, it is not thus limited but is susceptible to various changes and modifications without departing from the spirit and scope of the invention.

What is claimed is:

1. An automatic parking brake application system with manual disengage for a motor vehicle, the system comprising:
    a compressed air source;
    a push-pull valve having an inlet and an outlet;
    a parking brake spring chamber having an inlet coupled to the outlet from the push-pull valve;
    a first air delivery line coupled to supply compressed air from the compressed air source to the inlet of the push-pull valve;
    a first piloted lock-in valve having an inlet, an outlet, a control port and an exhaust port, with the inlet connected to receive air from the compressed air source and the outlet connected to the inlet to the push-pull valve;
    a first check valve connected to pass air from the outlet of the piloted lock-in valve back to the first air delivery line between the compressed air source and the inlet to the first piloted lock-in valve;
    a solenoid actuated control port valve responsive to at least a first interlock signal for applying compressed air to the control input of the first piloted lock-in valve; and
    a first solenoid actuated control valve connected to the exhaust port of the first piloted lock-in valve, the solenoid actuated control valve being connected for response to at least a first selected actuation signal.

2. The automatic parking brake application system with manual disengage as set forth in claim 1, further comprising:
    a transmission gear selector for generating the first selected actuation signal responsive to the gear selector being moved to a park position
    an air line connecting the outlet from the push-pull valve to the inlet to the spring brake chamber;
    a pressure sensitive signal generator coupled to the air line connecting the outlet from the push-pull valve for disabling closure;
    a relay coupling any signal from the pressure sensitive signal generator to the transmission gear selector as an enable signal for canceling the first selected actuation signal.

3. The automatic parking brake application system with manual disengage as set forth in claim 2, further comprising:
    the compressed air source comprising a primary air source and a secondary air source with the inlet to the first piloted lock-in valve being connected to the primary air source;
    the push-pull valve being a push pull double check valve with first and second inlets and an outlet;
    a second piloted lock-in valve having an inlet, an outlet, a control input and an exhaust with the inlet being connected to the secondary air source and the outlet being connected to one of the two inlets to the push pull double check valve;

the solenoid actuated control port valve being connected to the control input of the second piloted lock-in valve; and a second solenoid actuated control valve connected to the exhaust port of the second piloted lock-in valve, the solenoid actuated control valve being connected for response to at least the first selected actuation signal.

4. The automatic parking brake application system with manual disengage as set forth in claim 3, further comprising:

logic means responsive to at least the first interlock signal for generating an actuation signal for application to the solenoid actuated control port valve.

5. The automatic parking brake application system with manual disengage as set forth in claim 4, the interlock signals comprising at least an ignition switch position signal.

6. An air brake system for a motor vehicle, the air brake system comprising:

primary and secondary compressed air sources;

a pedal actuated brake valve having primary and secondary inlets connected to the primary and secondary sources, respectively, and primary and secondary outlets;

a primary service brake including a quick release valve connected to the primary outlet from the pedal actuated brake valve;

a secondary service brake including a quick release valve connected to the secondary outlet from the pedal actuated brake valve;

an ignition switch having a plurality of positional states;

enable logic responsive to the positional state of the ignition switch for generating a pneumatic enable signal;

a push pull double check valve having primary and secondary inlets and an outlet;

a primary source latch valve having an inlet coupled to the primary compressed air source, an outlet connected to the primary inlet for the push pull double check valve, a control input connected to receive the pneumatic enable signal and an exhaust outlet;

a secondary source latch valve having an inlet coupled to the secondary compressed air source, an outlet connected to the secondary inlet for the push pull double check valve, a control input connected to receive the pneumatic enable signal and an exhaust outlet;

a first check valve connecting the outlet of the primary source latch valve back to the inlet of the primary source latch valve;

a second check valve connecting the outlet of the secondary source latch valve back to the inlet of the secondary source latch valve;

a parking brake having an air inlet coupled by a parking brake air line to the outlet of the push pull double check valve;

a first exhaust control valve for selectively opening and closing the exhaust outlet for the primary source latch valve for releasing air held downstream from the primary source latch valve; and a second exhaust control valve for selectively opening and closing the exhaust outlet for the secondary source latch valve for releasing air held downstream from the secondary source latch valve.

7. The air brake system of claim 6, further comprising:

a transmission gear selector generating a park signal when positioned in park; and a controller responsive to presence of the park signal for opening the first and second exhaust control valves.

8. The air brake system of claim 7, further comprising:

a pressure sensitive element in communication with the parking brake air line for generating an enable signal for application to the transmission gear selector and preventing automatic disengagement of the parking brake.

9. The air brake system of claim 8, further comprising:

a vehicle cab interior;

the pedal actuated brake valve, the push pull double check valve, the primary source latch valve, the secondary source latch valve, the first check valve, the second check valve, the first exhaust control valve and the second exhaust control valve all being installed in the vehicle cab interior.

* * * * *